United States Patent [19]

Baudro

[11] Patent Number: 4,659,536
[45] Date of Patent: Apr. 21, 1987

[54] SYSTEM AND METHOD FOR CONSOLIDATING SPENT FUEL RODS

[75] Inventor: Thomas O. Baudro, Gales Ferry, Conn.

[73] Assignee: Proto-Power Corporation; Groton, Conn.

[21] Appl. No.: 745,402

[22] Filed: Jun. 14, 1985

[51] Int. Cl.[4] .............................................. G21C 19/32
[52] U.S. Cl. .................................. 376/261; 376/272; 29/723
[58] Field of Search ............... 376/272, 271, 268, 264, 376/452, 253, 342, 261; 29/723, 400 N

[56] References Cited

U.S. PATENT DOCUMENTS

| | | | |
|---|---|---|---|
| 2,905,338 | 9/1959 | Koch | 376/264 |
| 3,039,949 | 6/1962 | Newton et al. | 376/271 |
| 3,168,444 | 2/1965 | Ingram | 376/271 |
| 4,225,388 | 9/1980 | Bellaiche et al. | 376/353 |
| 4,269,660 | 5/1981 | Neuenfeldt et al. | 376/271 |
| 4,336,103 | 6/1982 | Katsher et al. | 376/251 |
| 4,414,475 | 11/1983 | Kratz et al. | 376/272 |
| 4,441,242 | 4/1984 | Hicken et al. | 376/272 |
| 4,446,098 | 5/1984 | Pomaibo et al. | 376/261 |
| 4,474,727 | 10/1984 | Kmonk et al. | 376/272 |
| 4,482,520 | 11/1984 | Randazza | 376/248 |
| 4,487,741 | 12/1984 | Vuckovich et al. | 376/277 |
| 4,547,117 | 10/1985 | Shields et al. | 376/272 |

FOREIGN PATENT DOCUMENTS 0031898  3/1979  Japan .................................... 376/272

*Primary Examiner*—Donald P. Walsh
*Assistant Examiner*—Dan Wasil
*Attorney, Agent, or Firm*—Pasquale A. Razzano

[57] ABSTRACT

A system for consolidating spent fuel rods from spent fuel assemblies includes an operator and control station, a fuel rod transfer tool with a gripper assembly, indexing devices, and a fuel consolidation station. The fuel rod transfer tool and gripper assembly grips a fuel rod and withdraws it from a fuel bundle until it is clear of the bundle. The tool, with the fuel rod drawn up inside it, is moved to another location where it is desired to place the fuel rod; the tool inserts the rod, and the gripper releases it. The fuel consolidation station has a frame that holds two fuel assemblies and a consolidation container. The bottom of the frame rests on the floor of the fuel pool. The top of the frame supports the indexing devices. An indexing device is provided for each of the fuel assemblies and the consolidation container. An indexing device for a fuel asembly is capable of guiding the gripper assembly to a position above a preselected rod in the associated fuel assembly, while the indexing device for the consolidation container is capable of guiding the gripper assembly, which may be holding a rod, to a position above a preselected location in the consolidation container. Preferably, each indexing device has an indexing head that is slidably mounted on a pair of rails, and these pairs of rails are slidably mounted on a further pair of rails. The further pair of rails runs transversely to the former pairs of rails, thus permitting each indexing head to be moved in two perpendicular directions.

30 Claims, 8 Drawing Figures

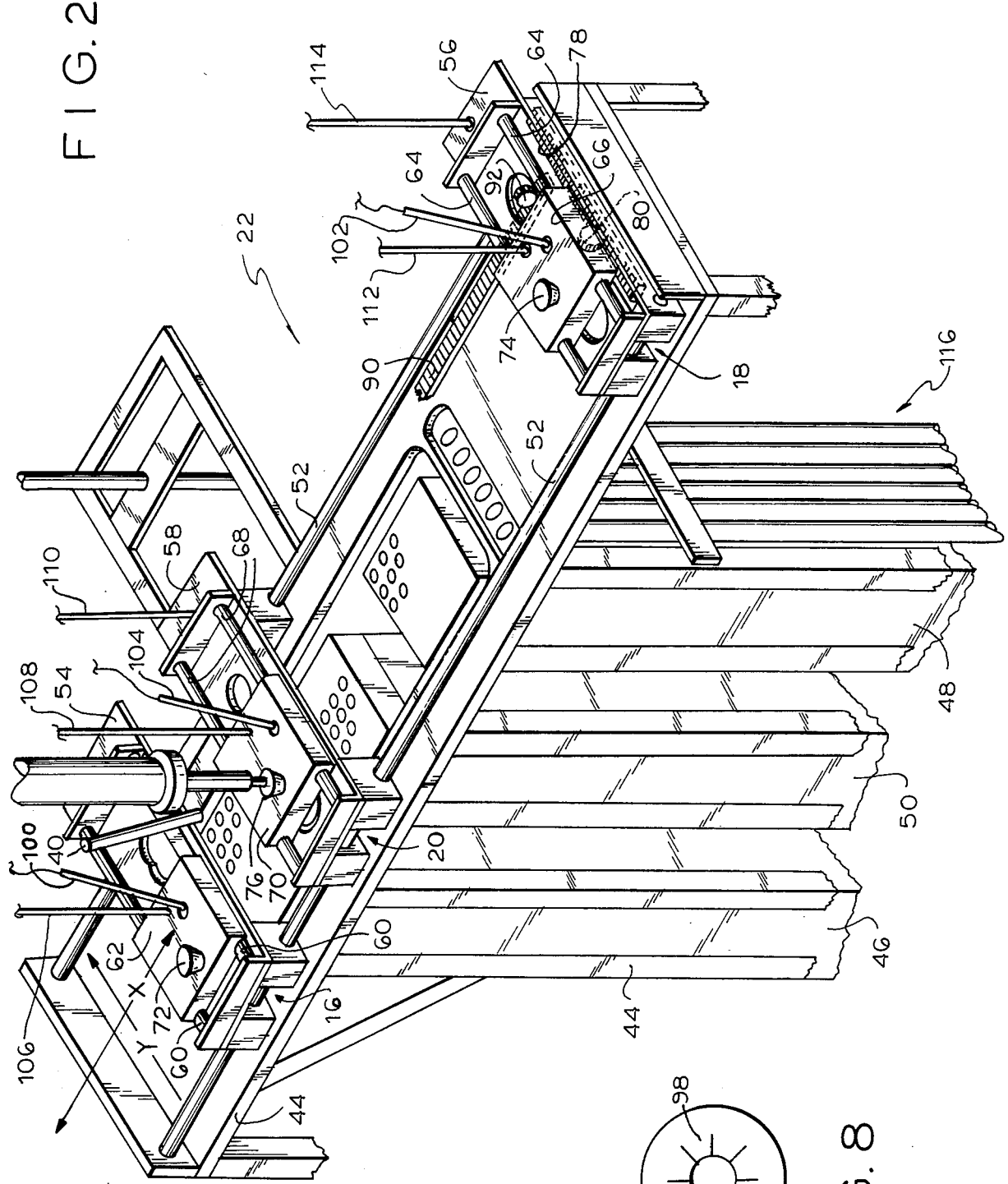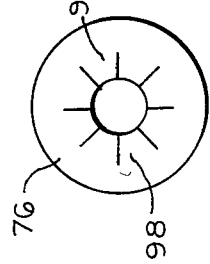

SYSTEM AND METHOD FOR CONSOLIDATING SPENT FUEL RODS

BACKGROUND OF THE INVENTION

The present invention relates, in general, to nuclear power plants. More particularly, the present invention pertains to a system and a method for consolidating spent fuel rods from spent fuel assemblies.

In a nuclear power reactor, fuel rods are typically held in a fuel assembly by a grid structure, which positions the fuel rods so that they are spaced from one another. Once a fuel assembly has been sufficiently used in the nuclear reactor, it is removed from the nuclear reactor and usually stored in a fuel pool in the nuclear power plant. The spent fuel assembly is radioactive, emitting alpha, beta, and gamma radiation; consequently, it generates decay heat. The water in the fuel pool removes some decay heat through free circulation. The water in the fuel pool also provides some shielding from the radiation emitted by the spent fuel assemblies in the pool. The spent fuel assemblies are located with sufficient spacing between them to preclude criticality.

Fuel pools in existing nuclear power plants were typically designed to accommodate spent fuel assemblies for interim storage only. The expectation was that reprocessing plants would be in service and that the spent fuel assemblies would be sent to such plants. However, such plants have not yet become operational. Furthermore, facilities for long-term storage of spent fuel assemblies on a large-scale basis are presently nonexistent. Accordingly, spent fuel assemblies are being stored in the fuel pools of nuclear power plants, and the available storage space in such pools is rapidly being consumed.

In order to provide more storage space in their fuel pools, many nuclear power plants have installed, or intend to install, racks in their fuel pools that will permit the fuel assemblies to be stored closer together. These racks are typically equipped with sheets of shielding material located between the fuel assemblies. The sheets of shielding material enable the fuel assemblies to be stored closer together without becoming critical. Conventional fuel pool racks, however, generally have insufficient storage capacity to accommodate the spent fuel assemblies and rods that will accumulate during the lifetime of a nuclear power plant.

Accordingly, a need exists for a system and a method for simply and efficiently, and therefore inexpensively, consolidating spent fuel rods from spent fuel assemblies and arranging the rods in a densely packed configuration for storage.

SUMMARY OF THE INVENTION

The present invention satisfies the need for a system and a method for simply and efficiently consolidating spent fuel rods from spent fuel assemblies and arranging the rods in a densely packed configuration. The present invention solves the problems associated with known systems and methods by providing a system with a consolidation container in which the spent fuel rods may be packed and a frame in which the container and a fuel assembly, or preferably two fuel assemblies, may be held. The system includes a fuel rod transfer tool with a gripper assembly. The gripper assembly is capable of gripping and releasing a fuel rod, while the tool is capable of moving the gripper assembly upwardly and downwardly. The system also includes indexing devices. One indexing device guides the gripper assembly to a position above a preselected rod in a fuel assembly. From this position, the gripper assembly may grip the preselected rod, and then the tool withdraws it from the fuel assembly. Another indexing device guides the gripper assembly to a position above a preselected location in the storage container. From this position, the gripper assembly may release the preselected rod into the preselected location. When the frame is constructed to hold two fuel assemblies, the system advantageously employs one indexing device for each fuel assembly, as well as an indexing device for the storage container.

Preferably, the system allows the fuel rod to be inspected. The system may contain a television camera and a television monitor. The camera is positioned so that an operator may observe an image of the preselected rod as it is being withdrawn from the fuel assembly or inserted into the storage container. The fuel rod transfer tool may be constructed to permit the preselected rod to be inspected to determine whether the preselected rod has a cladding defect. For instance, the fuel rod transfer tool may be designed to permit a withdrawn rod to be completely contained within it and to permit cooling water flow past the rod to be adjusted so that the temperature of the rod is raised to a predetermined temperature. A defective rod will give off gas, which would contain fission products which can be detected. If a rod is found to be defective, the rod may be stored in a storage container for defective rods.

The spent fuel rods in the fuel assembly or assemblies and the storage container may be cooled during consolidation operations by moving water downwardly through the fuel rods. Surface contamination that is washed away by the cooling water may be collected in cavities below the fuel assembly or assemblies and the storage container. The cooling water may be filtered and/or purified, preferably by utilizing the fuel pool filtration and purification systems.

Each indexing device advantageously includes a guide funnel, and the guide funnel for the indexing device for the consolidation container desirably has a plurality of flexible fingers, the ends of which define a circle having a diameter approximately equal to the diameter of a fuel rod. Moreover, the indexing device for a fuel assembly may be slidably mounted on a pair of rails, and the indexing device for the consolidation container may be slidably mounted on another pair of rails. These pairs of rails may be slidably mounted on a further pair of rails, which runs transversely to the former pairs of rails.

The system may include a control system for automatically moving the indexing devices to predetermined positions upon receiving suitable input signals. The control system may have indicators for providing sensory perceptible indications of various conditions, such as when an indexing device is in a desired position, when the preselected rod has been withdrawn from the fuel assembly, when the preselected rod has been inserted into the consolidation container, and when appropriate interlocks are operative.

In operation, the indexing device for the fuel assembly is aligned over a preselected rod in the fuel assembly, and the indexing device for the consolidation container is aligned over a preselected location in the consolidation container. The tool is then aligned with the preselected rod, and the gripper assembly is moved downwardly and guided into a position above the preselected rod by the indexing device for the fuel assembly. From this position, the gripper assembly grips the preselected rod, and it is then moved upwardly by the tool and withdrawn from the fuel assembly. Next, the tool is aligned with the preselected location in the consolidation container. The gripper assembly, which is holding the preselected rod, is moved downwardly to a position above the preselected location. Finally, the preselected rod is released into the preselected location. The gripper assembly may then be raised and the foregoing steps repeated, with the rods being densely packed in the consolidation container. By this method, spent fuel rods in spent fuel assemblies may simply and efficiently be consolidated in a consolidation container.

BRIEF DESCRIPTION OF THE DRAWINGS

The above and other features and advantages of the present invention will become apparent upon consideration of the following detail description of an illustrative embodiment thereof, especially when taken in conjunction with the accompanying drawings, wherein:

FIG. 2 is an enlarged perspective view of a portion of the spent fuel rod consolidation system illustrated in FIG. 1, with parts broken away for clarity;

FIG. 8 is a top plan view of a guide funnel for an indexing head.

DETAILED DESCRIPTION OF THE PREFERRED EMBODIMENT

Figure 1:
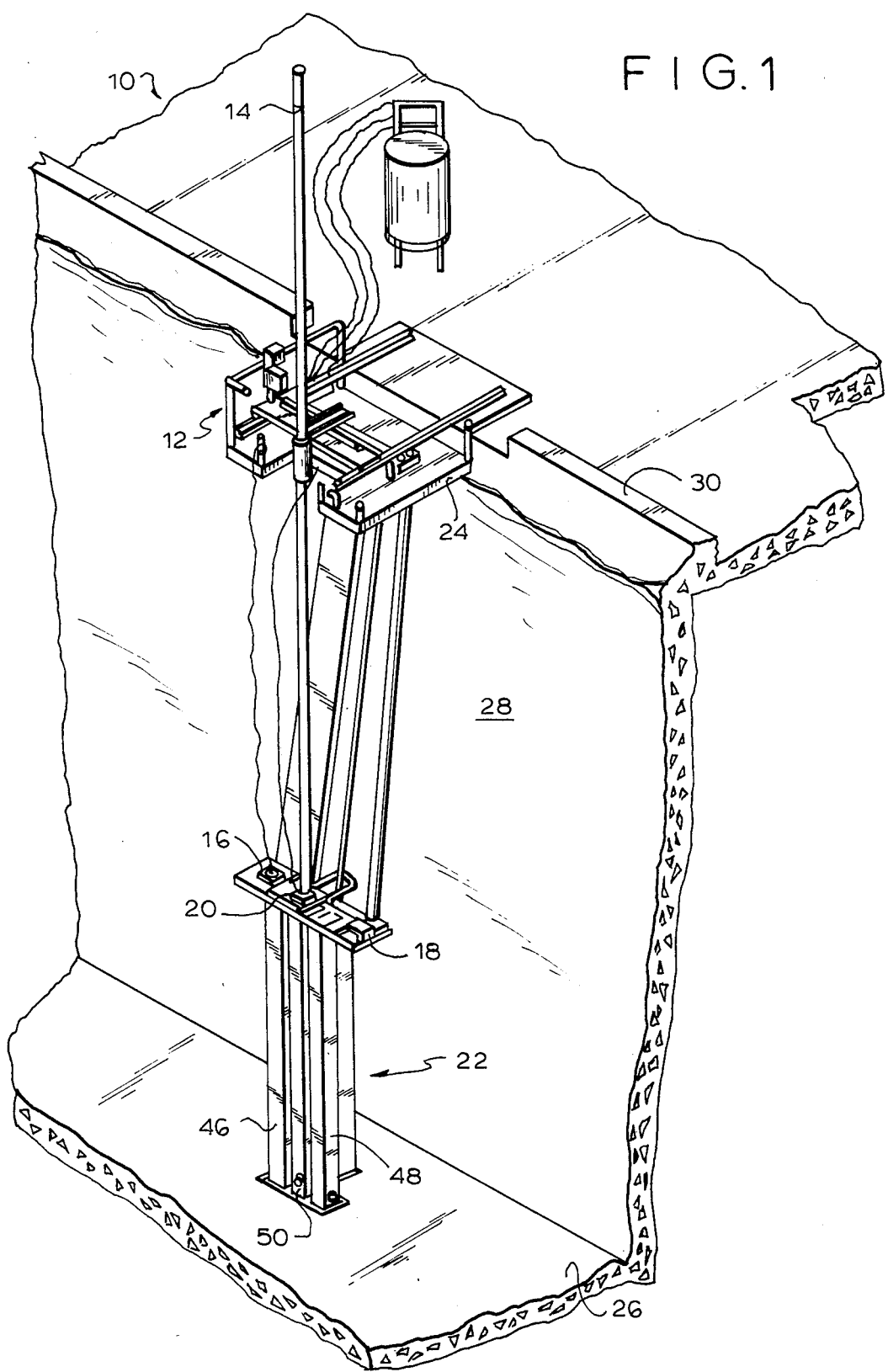
FIG. 1 is a perspective view of a spent fuel rod consolidation system according to the present invention.

Referring now to the drawings, and specifically to FIG. 1, a system 10 for consolidating spent fuel rods from spent fuel assemblies is shown. System 10 includes an operator and control station 12, a fuel rod transfer tool 14, indexing devices 16, 18, and 20, and a fuel consolidation station 22. Each of these stations and devices will be discussed in greater detail below.

Operator and control station 12 includes a platform 24 supported by supports (not shown) rising from the floor 26 of the fuel pool 28 and is steadied by the curbing 30. Alternatively, platform 24 may be cantilever supported over the pool entirely by the curbing 30 in any convenient manner. An operator in operator and control station 12 manipulates fuel rod transfer tool 14 and positions it above various locations in the fuel consolidation station 22. The fuel consolidation station 22 rests on the floor 26 of fuel pool 28.

Figure 3:
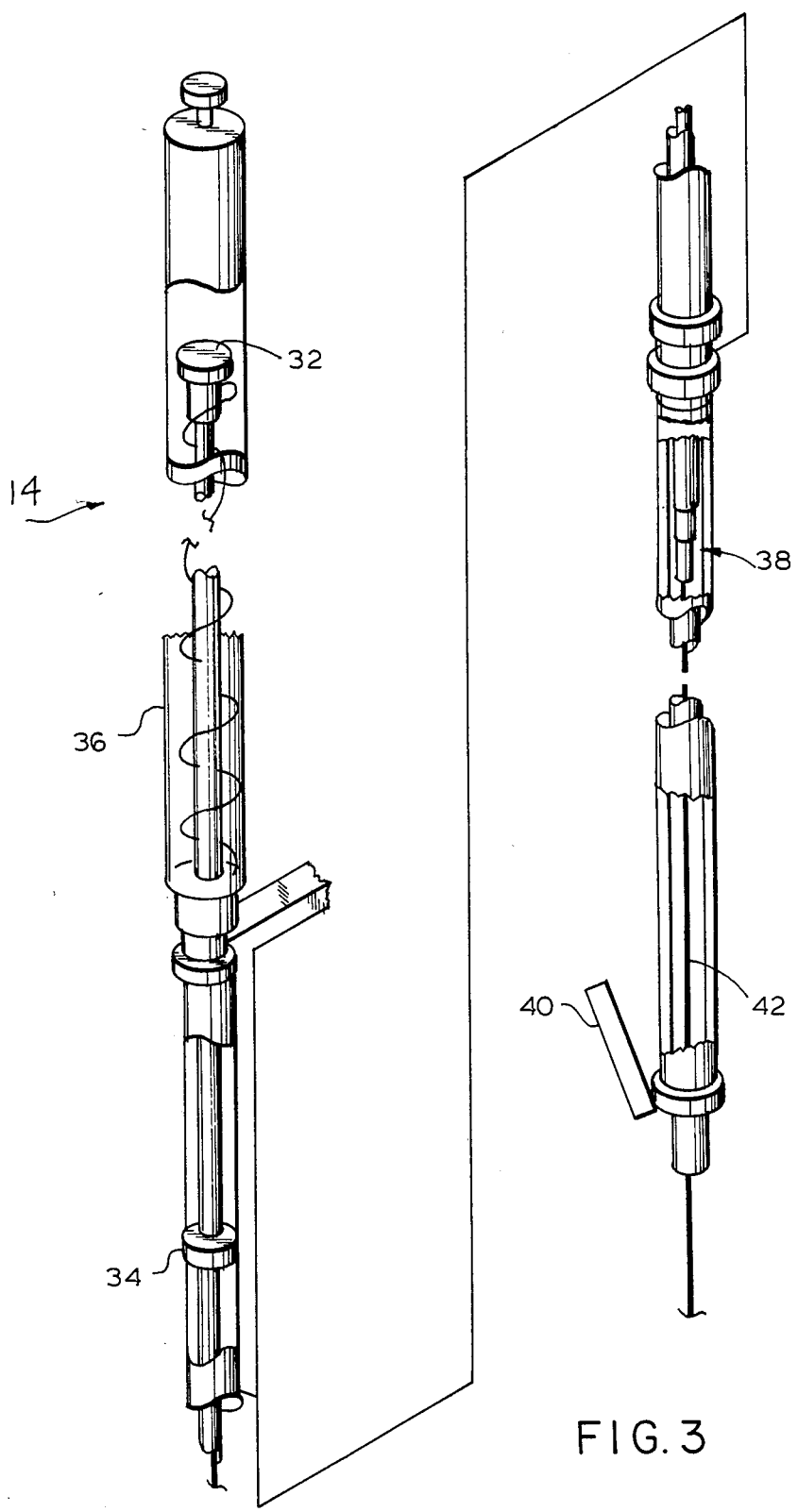
FIG. 3 is a perspective view of a fuel rod transfer tool for use in a spent fuel rod consolidation system, with parts broken away for clarity.

Fuel rod transfer tool 14, illustrated in an enlarged scale in FIG. 3, is designed to be positioned and controlled by a single operator. The tool 14 has two hydraulically controlled pistons 32, 34 mounted in a cylinder 36 that forms part of the tool. Piston 32 operates to open and close a gripper assembly 38 in the tool 14. Consequently, piston 32 is referred to as the gripper piston. Piston 34 operates to move the gripper assembly 38 upwardly and downwardly. Accordingly, piston 34 is referred to as the withdrawal piston.

A television camera 40, which is part of a closed-circuit television system, is located at the lower end of tool 14 so that the operator may visually observe on a television monitor an image of a fuel rod while it is being withdrawn or inserted by tool 14. Camera 40 is arranged to allow the operator to position tool 14 to a desired location, as is discussed below. FIG. 3 depicts a fuel rod 42 in a partially withdrawn condition.

Withdrawal piston 34 is actuated to move gripper assembly 38 downwardly to a position above a rod. With the gripper assembly 38 in such a position, gripper piston 32 is actuated to cause gripper assembly 38 to latch or grip the rod. The withdrawal piston 34 is then actuated to move gripper assembly 38, and therefore the latched rod, upwardly. When a latched rod is to be inserted and released, withdrawal piston 34 is actuated to move gripper assembly 38 and the latched rod downwardly, and then gripper piston 32 is actuated to release the rod.

Cylinder 36 may have a transparent portion so that the operator may monitor the movements of the tool internals, e.g., the gripper piston 32 and the withdrawal piston 34, and note the heights of the tool internals by observing the height of the gripper piston 32.

In addition, the lower portion of the tool 14 is advantageously constructed to enable a fully withdrawn rod to be housed completely within it. Moreover, tool 14 is desirably designed to permit cooling water to flow past the housed fuel rod and to permit the cooling water flow rate to be adjusted. Accordingly, the heat transfer rate from the fuel rod may be adjusted. This feature enables the temperature of the fuel rod to be raised to a predetermined temperature, thereby inducing off gassing from a fuel rod with defective cladding. Fission products in the resulting gas may the be detected. This operation is a so-called fuel rod sipping procedure. By this procedure, the operator may inspect individual spent fuel rods for cladding defects.

Preferably, a fully withdrawn rod is housed completely within the lower one third of tool 14, and the lower two thirds of tool 14 is submerged in fuel pool 28. The fuel pool water between the rod and the operator in the operator and control station 12 provides shielding for the operator. Moreover, if the lower two thirds of the tool 14 is usually submerged, the upper one third of the tool 14 is preferably transparent, which, as noted before, allows the operator to monitor the position and operation of the tool internals.

Suitable fuel rod transfer tools for use in the present invention are shown and described in U.S. Pat. No. 4,482,520, issued Nov. 13, 1984, and in U.S. patent application Ser. No. 427,621, filed on Sept. 29, 1982, the disclosures of which are incorporated herein by reference.

FIG. 2 illustrates the indexing devices 16, 18, and 20 and the fuel consolidation station 22 in more detail than FIG. 1. The fuel consolidation station 22 has a frame 44 that holds fuel assemblies 46 and 48 and a consolidation container 50. The fuel assemblies 46 and 48 and the consolidation container 50 may be removed from the frame 44 when required by a fuel handling crane and full fuel assemblies and an empty consolidation container may subsequently be installed. The consolidation container 50 is described during the discussion of FIGS. 4 and 5 below.

The bottom of the frame 44 rests on the floor 26 of fuel pool 28, and frame 44 is provided with leveling pads and location locks. An indexing system is mounted on the top of frame 44.

The indexing system, which is best depicted in FIG. 2, includes the indexing devices 16, 18, and 20. The indexing system further includes a pair of rails or bedways 52. The indexing devices 16, 18, and 20 have plates 54, 56, and 58, respectively, which are mounted to slide along rails 52. The indexing device 16 has a pair of rails or bedways 60 connected to plate 54 with an indexing head or platform 62 slidably mounted on rails 60. Similarly, indexing device 18 has a pair of rails or bedways 64 connected to the plate 56 with an indexing head or platform 66 slidably mounted on rails 64. Correspondingly, indexing device 20 has a pair of rails or bedways 68 connected to plate 58 with an indexing head or platform 70 slidably mounted on rails 68. The rails 52 run transversely to the rails 60, 64, and 68.

Guide funnels 72, 74, and 76 are secured to the platforms 62, 66, and 70, respectively and are aligned with apertures formed in these platforms (but not seen in FIG. 2).

Plates 54, 56, and 58 each have a rack mounted thereon, while platforms 62, 66, and 70 each have a pinion rotatably mounted thereon. Each pinion meshes with its associated rack and thus drives its associated platform back and forth along the associated plate when the pinion is rotated. This direction of motion is identified as the Y direction in FIG. 2. For convenience, only the rack and the pinion for the indexing device 18 are illustrated in FIG. 2. As seen therein, rack 78 is mounted on plate 56 and pinion 80 is rotatably mounted on platform 66. Plates 54, 56, and 58 are driven sideways (in the X direction of FIG. 2) along the fuel consolidation station 22 by pinions mounted thereon to mesh with a rack 90 which is a part of the indexing system and which is mounted on frame 44. Again, for convenience, only the pinion 92 for indexing device 18 is shown in FIG. 2. This arrangement of bedways and gears permits platforms 62, 66, and 70 to be moved in two perpendicular directions.

Rails 52 are shown in FIG. 2 as extending beyond the fuel assemblies 46 and 48, thereby providing a space on either side of the assemblies in which indexing devices 16, 18, and 20 may be stored when not in service.

Plate 54 and platform 62 are positioned over fuel assembly 46 so that guide funnel 72 may guide gripper assembly 38 of tool 14 to a position above a preselected rod in the fuel assembly 46 after the operator aligns tool 14 therewith. Similarly, plate 56 and platform 66 are positioned so that guide funnel 74 can guide gripper assembly 38 of tool 14 to a position above a preselected rod in the fuel assembly 48. From either of these positions, gripper assembly 38 may latch a preselected rod in the fuel assemblies if gripper piston 32 is actuated.

Plate 58 and platform 70 are adapted to be positioned over consolidation container 50 so that when the tool 14 is aligned therewith by the operator, guide funnel 76 will be in a position to guide gripper assembly 38, which may be holding a rod, to a position above a preselected location in consolidation container 50. In this position tool 14 inserts the rod into and gripper assembly 38 releases the rod in the preselected location.

Plates 54, 56, and 58 and platforms 62, 66, and 70 are positioned by electric stepping motors (not shown) which drive the respective pinions through reach rods 106, 108, 110, 112, and 114. Alternatively, the plates and platforms may be manually positioned.

Gripper guide funnel 76 advantageously includes a plurality of flexible fingers, as seen in FIG. 8. The lower ends of the flexible fingers 98 define a circle, the diameter of which is approximately equal to the diameter of a fuel rod. Fingers 98, therefore, guide a fuel rod as it is being lowered by tool 14. When gripper assembly 38 reaches fingers 98, gripper assembly 38 spreads the fingers apart to allow the rod to be bottomed. After the gripper assembly is raised, fingers 98 return to their original configuration.

Preferably, indexing devices 16, 18, and 20 additionally include optical boroscopes 100, 102, and 104, respectively, and associated lighting. Boroscopes 100, 102, and 104 may be coupled to the closed-circuit television system to enable the operator to observe the gripper assembly-fuel rod interface. (By contrast, television camera 40, which is secured to tool 14, allows the operator to observe the gripper assembly-guide funnel interface.)

As illustrated in FIG. 2, fuel consolidation station 22 further includes a plurality of storage containers 116 for storing defective fuel rods. A fuel rod may be defective, for instance, because it is bent or deformed or because it has a cladding defect. A fuel rod that is determined to be defective may be stored in one of the storage containers 116 in lieu of consolidation container 50. The operator may determine that a fuel rod is defective by visually observing it while it is being withdrawn from a fuel assembly or after reviewing the results of the sipping operation.

Figure 4:
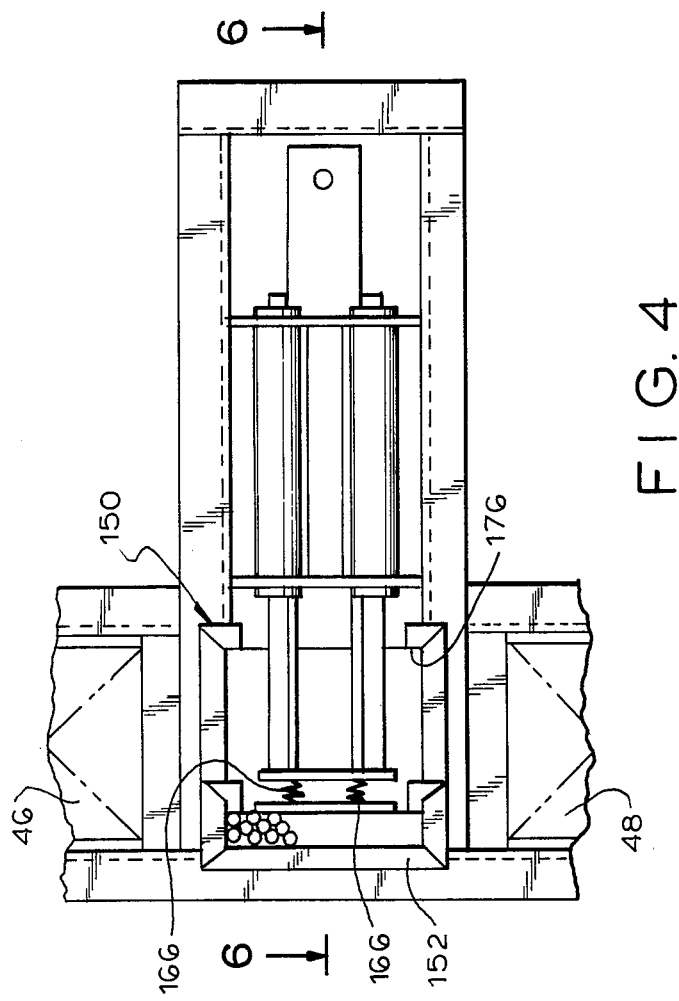
FIG. 4 is a top plan view of a consolidation container for the spent fuel rod consolidation system of FIG. 1, with parts broken away for clarity.
Figure 5:
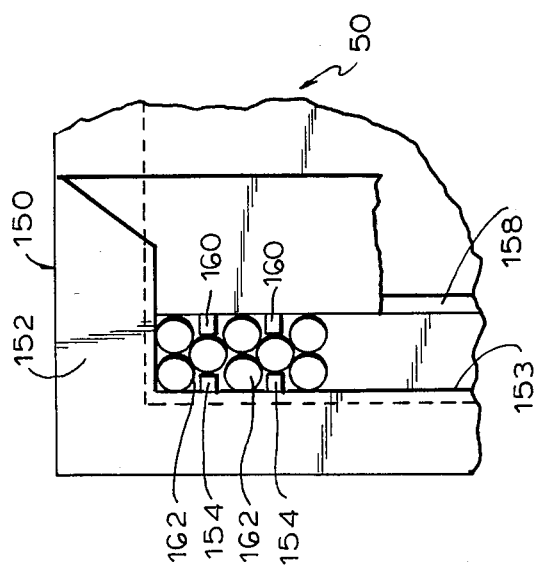
FIG. 5 is an enlarged top plan view of the consolidation container illustrated in FIG. 4, with parts broken away for clarity.
Figure 6:
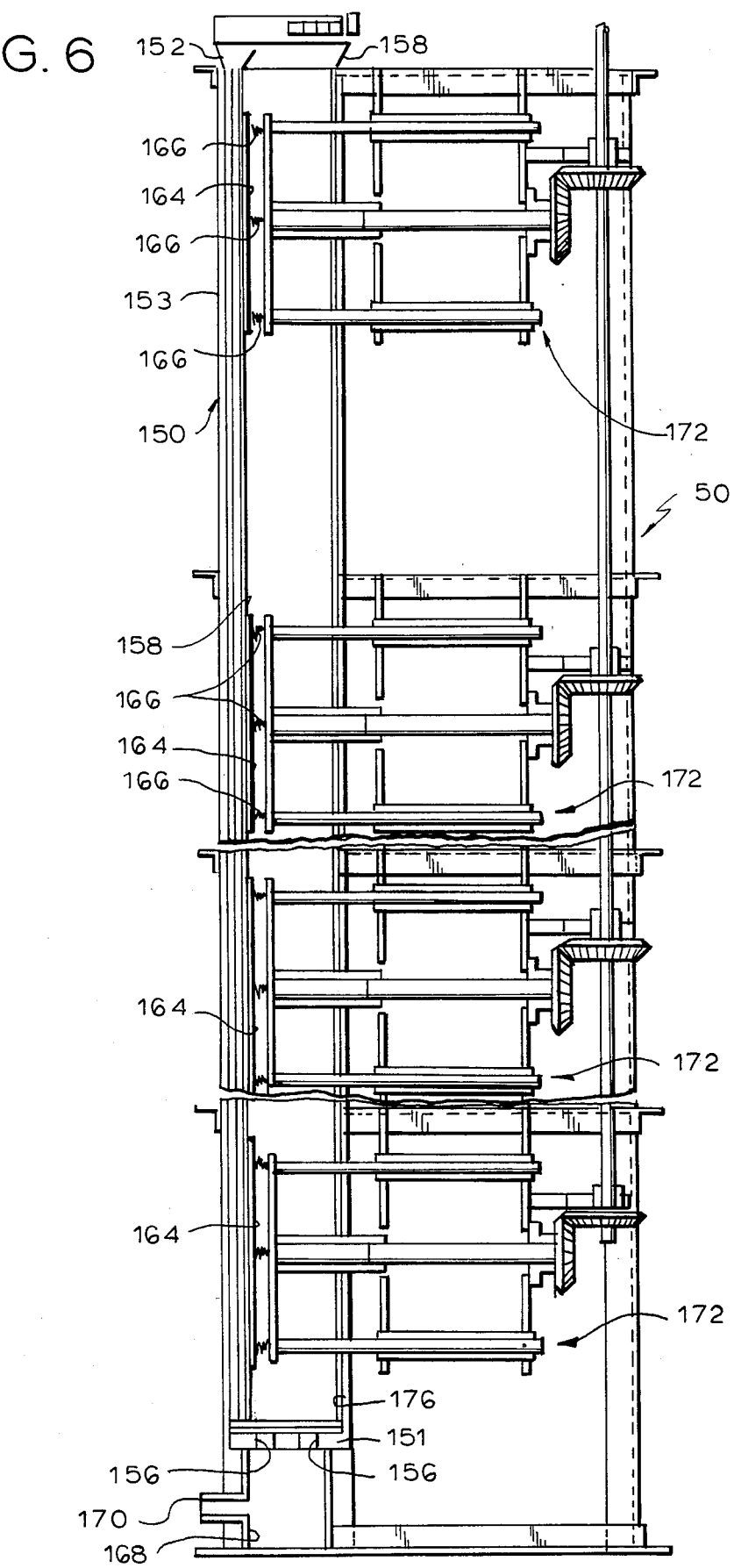
FIG. 6 is a sectional view taken along line 6—6 of FIG. 4 of the consolidation container and its operating mechanism.

Fuel consolidation station 22 is shown in more detail in FIGS. 4, 5, and 6. Suitable fuel consolidation stations are also shown in copending, commonly owned U.S. patent application Ser. No. 745,409, which was filed on June 14, 1985, the disclosure of which is incorporated herein by reference.

Consolidation container 50 depicted in FIGS. 4, 5, and 6 includes a tall, square metal box 150 that is open at the top and provided with a removable cover and lifting attachments. The bottom and the sides of box 150 are connected together. The top of box 150 includes a sloping portion 152, which aids in properly positioning fuel rods in the box 150. The dimensional geometry of the box 150 accurately reflects the controlling dimensions of a spent fuel assembly, thereby allowing it to be readily installed in an existing spent fuel storage rack system. The bottom of the box, the sides of the box above the fuel rods, and the cover are provided with holes to allow water to flow through the box and convectively cool the fuel rods contained in the box. FIG. 6 shows holes 156 in the bottom 151 of the box 150.

Front wall 153 of box 150 has a plurality of flutes 154 formed therein defined by generally vertically extending bars secured thereto. Flutes 154 are employed to guide and hold the first row of rods in its proper position to insure maximum density packing. A moving installation sheet 158 is installed in box 150 from the top. This sheet is fitted on its interior side, i.e., the side facing the fluted surface of the front wall 153, with a multiplicity of resilient fingers 160 positioned to precisely line up with flutes 154 and the channels 162 defined by the flutes. Fingers 160 are bent outwardly toward the fluted surface so that they bear against the flutes or against the channels or against fuel rods inserted between the flutes. Resilient fingers 160 are, thus, always bearing against the front wall or against inserted rods, thereby holding inserted rods in position while guiding additional rods into the desired positions as they are inserted.

Fuel consolidation station 22 contains and provides support for a pressure-pad operating system which, as seen in FIG. 6, has several cross-head guided jackscrew extension devices 172 operated by a common stepping motor drive. Each extension device 172 causes a spring-loaded pressure pad 164 to be brought to bear upon the moving installation sheet 158 through openings 174 in the back wall 176 of box 150. The use of spring-loaded pressure pads allows the operator to maintain control over the forces that are exerted on the packed fuel rods. As each row of rods is installed, pressure pads 164 are backed off sufficiently to allow installation of the next row. The common stepping motor drive is provided with an optional manual operator.

Fuel rods removed from fuel assemblies 48, 46 are positioned for insertion in the container by fuel rod transfer tool 14 and the indexing device 20. As each rod in the first row is inserted, the resilient fingers 160 occupying the channels 162 between the flutes 154 are deflected out of the way. The moving installation sheet 158 is pushed back slightly by the rod just inserted, which compresses the pressure pad resilient elements, e.g., springs 166. Resilient fingers 160 resting against flutes 154 spring outward and remain against flutes 154. In preparation for the insertion of the first rod of the next row, moving installation sheet 158 is moved back (by the stepping motor or the manual operator). Resilient fingers 160 spring outward, thereby preventing any rods which might tend to move from getting out of alignment with their intended locations. As each succeeding row of rods is inserted, the moving installation sheet 158 is moved back until it bears against back wall 176 of the box 150.

Since the fuel rod withdrawal and insertion process may result in a significant release of radioactive surface contamination, each of the bottom cavities of the fuel consolidation station, i.e., the cavities under the two fuel assemblies and the cavity under the consolidation container, is provided with individual connections to the fuel pool water filtration system. As seen in FIG. 6, a cavity 168 is formed below consolidation container 50 and is connected to the fuel pool water filtration system by a fitting 170. Water may be continuously drawn down through the fuel rods in the two fuel assemblies and the consolidation container and then filtered and/or purified in order to minimize fuel pool contamination buildup.

Figure 7:
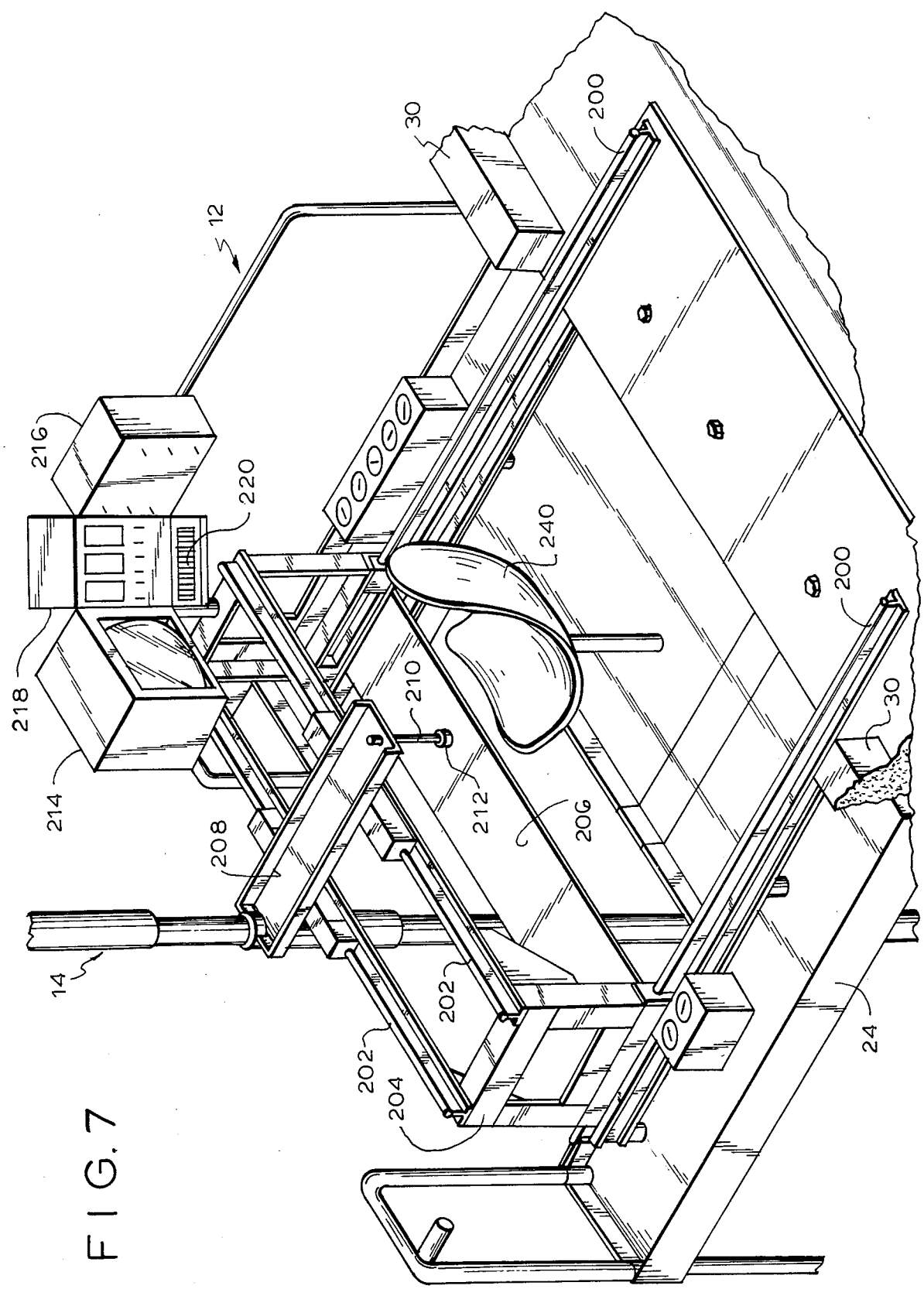
FIG. 7 is a perspective view of an operator and control station for the spent fuel rod consolidation system of FIG. 1.

FIG. 7 illustrates the operator and control station 12 in greater detail than in FIG. 1. As noted above, platform 24 is supported by the fuel pool floor 26 and steadied by the curbing 30 or it may be supported entirely by curbing 30. The operator manually moves the fuel rod transfer tool 14 forward or backward or sideways. Two pairs of rails are employed to permit such movement. A pair of rails or bedways 200 allows tool 14 to be moved forward and backward, while a pair of rails or bedways 202 allows tool 14 to be moved sideways.

A frame 204, which includes a plate 206, is mounted to slide along rails 200 and supports rails 202 transversely of rails 200. A control member 208 attached to tool 14 is supported on bushings mounted to slide on rails 202. A handle 210 is secured to control member 208 to enable the operator to slide plate 208 and thus tool 14 along rails 202. Tool 14 my be locked in a desired position by tightening down a brake 212 located at the rear end of the handle 210. Turning the brake 212, which is in the form of a threaded rod, causes the brake to join against plate 206 and thus hold the tool 14 in a fixed position.

Operator and control station 12 has a television monitor 214, a fuel rod transfer tool control panel 216, and an indexing control panel 218. Television monitor 214, together with television camera 40 and boroscopes 100, 102, and 104, allows the operator to observe the gripper assembly-guide funnel interface or the gripper assembly-fuel rod interface. The television monitor 214 may be a split-screen monitor, thereby permitting the operator to observe both interfaces simultaneously. Fuel rod transfer tool control panel 216 preferably includes toggle switches, designed to be used by a gloved operator, that enable the operator to control (a) the direction of movement of the gripper assembly, i.e., up or down; (b) the speed of movement of the gripper assembly, i.e., fast, slow, or very slow; (c) the manner of movement of the gripper assembly, i.e., continuous or incremental; and (d) the gripping action of the gripper assembly. The toggle switches control the alignment of associated valves in a hydraulic control system for the tool 14.

Indexing control panel 218 includes a keyboard actuator 220, which permits the operator to command each indexing device to a desired position and also permits the operator to control the position of the pressure pads. The indexing control panel 218 may include indicators that inform the oprator when (a) an indexing head has been moved to a desired position; (b) a fuel rod has been withdrawn from a fuel assembly; (c) a fuel rod has been inserted in a consolidation container; and (d) the pressure pads have been moved as desired. Indexing control panel 218 advantageously provides a visual status board and a hard copy record so that the operator may keep track of the fuel rods as they are transferred from the fuel assemblies to the consolidation container. The indexing control panel 218 also advantageously provides interlocks and warnings as necessary.

Rails 200 extend inwardly beyond curb 30. As a result, the operator and control station 12, including the monitoring and control devices 214, 216, and 218, may be moved between an extended position, in which fuel rod consolidation operations may take place, and a retracted position, in which a fuel handling crane may have access to the fuel assemblies and the consolidation container. The fuel handling crane is used to install and remove fuel assemblies and consolidation containers in addition to its other duties. To facilitate this, the operator's chair 240 is removably mounted in station 12 in any convenient manner.

Once full fuel assemblies and an empty consolidation container have been installed in the fuel consolidation station, the operator may begin fuel rod consolidation operations by using the keyboard on the indexing control panel to command an indexing device associated with a fuel assembly to a position in which its guide funnel is aligned with a preselected rod in the fuel assembly. At this time, the operator may also use the keyboard on the indexing control panel to command the indexing device associated with the consolidation container to a position in which its guide funnel is aligned with a preselected location in the consolidation container. The operator manually aligns the tool with the guide funnel of the indexing device for the fuel assembly (by moving the tool along rails 202 and 200) and, therefore, the preselected rod. The gripper assembly is lowered and guided by the guide funnel to a position above the pre-selected rod. The gripper piston is actuated so that the gripper assembly grips or latches the preselected rod. Next, the preselected rod is withdrawn. After the preselected rod has been withdrawn, the operator manually aligns the tool with the guide funnel of the indexing device for the consolidation container and, therefore, the preselected location by again sliding tool 14 on rails 202 and 200. While it is being lowered, the rod is being guided by the guide funnel of the indexing device for the consolidation container. The gripper assembly is lowered and guided by the guide funnel to a position above the preselected location. The preselected rod is inserted into the preselected location by downward movement of the gripper assembly by downward operation of the tool. Finally, the preselected rod being fully inserted into the preselected location is released by the gripper. The gripper assembly is raised in preparation for another fuel rod transfer, which the operator initiates by commanding the indexing devices to new positions.

Although a particular illustrative embodiment of the present invention has been described herein with reference to the accompanying drawings, the present invention is not limited to that particular embodiment. Various changes and modifications may be made thereto by those skilled in the art without departing from the spirit or scope of the present invention. For example, two fuel rod transfer tools may be employed, along with appropriate controls and interlocks, in order to decrease the time required to accomplish consolidation operations.

I claim:

1. A system for consolidating spent fuel rods from spent fuel assemblies, comprising:
    a consolidation container in which the fuel rods may be packed;
    a frame capable of holding a fuel assembly and the container during consolidation, the frame permitting each of the fuel assembly and the container to be removed;
    tool means with gripper means for gripping and releasing a rod, the tool means including means for moving the gripper means upwardly and downwardly;
    a first indexing head having first guide means for guiding the gripper means while the gripper means moves downwardly;
    a first rail, the first indexing head being slidably mounted on the first rail;
    a second indexing head having second guide means for guiding the gripper means while the gripper means moves downwardly;
    a second rail, the second indexing head being slidably mounted on the second rail; and
    a third rail, the first rail and the second rail being slidably mounted on the third rail;
    wherein the first indexing head is slidable on the first and third rails to a first position that is above a preselected rod in the fuel assembly; and
    wherein the second indexing head is slidable on the second and third rails to a second position that is above a preselected location in the container.

2. A system as defined in claim 1, wherein the first guide means for the first indexing head includes a first funnel and the second guide means for the second indexing head includes a second funnel.

3. A system as defined in claim 2, wherein the funnel for the second indexing head includes a plurality of flexible fingers, the ends of the fingers defining a circle having a diameter approximately equal to the diameter of a fuel rod.

4. A system as defined in claim 1, wherein the frame is capable of holding a second fuel assembly, the frame permitting the second fuel assembly to be removed, and further comprising a third indexing head having third guide means for guiding the gripper means while the gripper means moves downwardly, and a fourth rail, the fourth rail being slidably mounted on the third rail, wherein the third indexing head is slidable on the third and fourth rails to a third position that is above a second preselected rod in the second fuel assembly.

5. A system as defined in claim 1, further comprising means for inspecting the preselected rod.

6. A system as defined in claim 5, wherein the means for inspecting includes means for visually inspecting the preselected rod while the preselected rod is being moved upwardly by the tool means.

7. A system as defined in claim 1, further comprising means for determining whether the preselected rod has a cladding defect.

8. A system as defined in claim 1, further comprising storage means for holding at least one defective rod.

9. A system as defined in claim 1, further comprising means for cooling the fuel rods in the fuel assembly and the fuel rods in the container.

10. A system as defined in claim 9, wherein the cooling means includes means for moving water downwardly through the fuel rods in the container and the fuel rods in the fuel assembly.

11. A system as defined in claim 10, further comprising means for filtering the water.

12. A system as defined in claim 1, further comprising means for removing surface contamination from the fuel rods.

13. A system as defined in claim 1, wherein the frame and a portion of the tool means are submerged in a fuel storage pool, the fuel storage pool having a water level sufficient to provide shielding for an operator when the preselected rod is in a fully withdrawn position.

14. A system as defined in claim 1, further comprising control means for automatically moving the first indexing head to the first position upon receiving a first input signal and for automatically moving the second indexing head to the second position upon receiving a second input signal.

15. A system as defined in claim 14, wherein the control means includes first indicator means for indicating when the first indexing head is in the first position and second indicator means for indicating when the second indexing means is in the second predetermined position.

16. A system as defined in claim 14, wherein the control means includes third indicator means for indicating when the preselected rod has been withdrawn from the fuel assembly.

17. A system as defined in claim 14, wherein the control means includes fourth indicator means for indicating when the preselected rod has been inserted into the container.

18. A system as defined in claim 14, wherein the control means includes means for displaying the location of the preselected rod in the container.

19. A method for consolidating spent fuel rods from a spent fuel assembly using a tool with a gripper assembly, the gripper assembly being capable of gripping and releasing a rod, the tool being capable of moving the gripper assembly upwardly and downwardly, comprising the steps of:

slidably locating a first indexing device on a first rail to position said first indexing device over a preselected rod in the fuel assembly independently of said tool;

slidably locating a second indexing device on a second rail to position said second indexing device over a preselected location in a consolidation container independently of said tool;

positioning the tool above the first indexing device;

moving the gripper assembly downwardly to a first position that is above the preselected rod, the gripper assembly being guided by the first indexing device during at least part of the downward movement;

gripping the preselected rod with the gripper assembly;

moving the gripper assembly, which is holding the preselected rod, upwardly with the tool;

after the preselected rod has been withdrawn from the fuel assembly, positioning the tool and the preselected rod above the second indexing device;

moving the gripper assembly, which is holding the preselected rod, downwardly to a second position that is above the preselected location in the consolidation container, the gripper assembly being guided by the second indexing device during at least part of the downward movement, thereby inserting the preselected rod into the consolidation container; and releasing the preselected rod into the preselected location.

20. A method as defined in claim 19, further comprising the step of monitoring the condition of the preselected rod while moving the gripper assembly upwardly.

21. A method as defined in claim 19, further comprising the step of inspecting the preselected rod for cladding defects after the preselected rod has been withdrawn from the fuel assembly.

22. A method as defined in claim 21, wherein the inspecting step includes raising the temperature of the preselected rod to a predetermined temperature and determining whether off-gassing occurs.

23. A method as defined in claim 22, wherein the inspecting step further includes adjusting the temperature to which the preselected rod is raised by adjusting cooling water flow past the preselected rod.

24. A method as defined in claim 19, further comprising the step of storing a defective fuel rod in a storage container.

25. A method as defined in claim 19, further comprising the step of cooling the fuel rods in the fuel assembly and the fuel rods in the consolidation container.

26. A method as defined in claim 25, wherein the cooling step includes moving water downwardly through the fuel rods.

27. A method as defined in claim 26, further comprising the step of filtering the water.

28. A method as defined in claim 19, further comprising the steps of producing a first sensory perceptible indication when the preselected rod has been withdrawn from the fuel assembly and producing a second sensory perceptible indication when the preselected rod has been inserted into the consolidation container.

29. A method as defined in claim 19, wherein the first locating step includes automatically moving the first indexing device to a first predetermined position over the preselected rod in response to a first command signal, the first indexing device being able to guide the gripper assembly to the first position when the first indexing device is in the first predetermined position.

30. A method as defined in claim, 19, wherein the second locating step includes automatically moving the second indexing device to a second predetermined position over the preselected location in response to a second command signal, the second indexing device being able to guide the gripper assembly to the second position when the second indexing device is in the second predetermined position.

* * * * *